United States Patent [19]
Reichbach

[11] 3,921,868
[45] Nov. 25, 1975

[54] BICYCLE RACK

[76] Inventor: Hyman Reichbach, R.F.D No. 1, Hilda Drive, Mahopac, N.Y. 10541

[22] Filed: Aug. 5, 1974

[21] Appl. No.: 494,478

[52] U.S. Cl................................. 224/32 A; 224/39
[51] Int. Cl.² ........................................... B62J 11/00
[58] Field of Search........ 224/30 R, 31, 32 R, 32 A, 224/35, 37, 38, 39

[56] References Cited
UNITED STATES PATENTS

| 1,013,684 | 1/1912 | Popini | 224/39 R |
| 2,539,381 | 1/1951 | Bachmann | 224/32 R |
| 2,721,680 | 10/1955 | Steckman | 224/42.45 B X |
| 3,301,448 | 1/1967 | Inoue | 224/32 R |
| 3,744,688 | 7/1973 | Kezer | 224/32 R |

FOREIGN PATENTS OR APPLICATIONS

| 1,097,158 | 2/1955 | France | 224/39 R |

Primary Examiner—Robert G. Sheridan
Attorney, Agent, or Firm—Stanley J. Yavner

[57] ABSTRACT

A bicycle rack for rear fender mounting on a bicycle including brackets for supporting fishing poles so that the fishing poles extend rearwardly of the seat support of the bicycle and generally horizontally with respect to the ground. The rack includes a platform for supporting a fishing tackle box either by placing the box on the platform or by placing the box in a basket rearwardly depending from the platform. The bicycle rack is supported by bracketing it at its forward end to the seat support and either attaching it to the rear fender, attaching it to a prior art bicycle rack on the rear fender, and/or using elongated supports to attach the rack to the rear axle of the bicycle.

5 Claims, 8 Drawing Figures

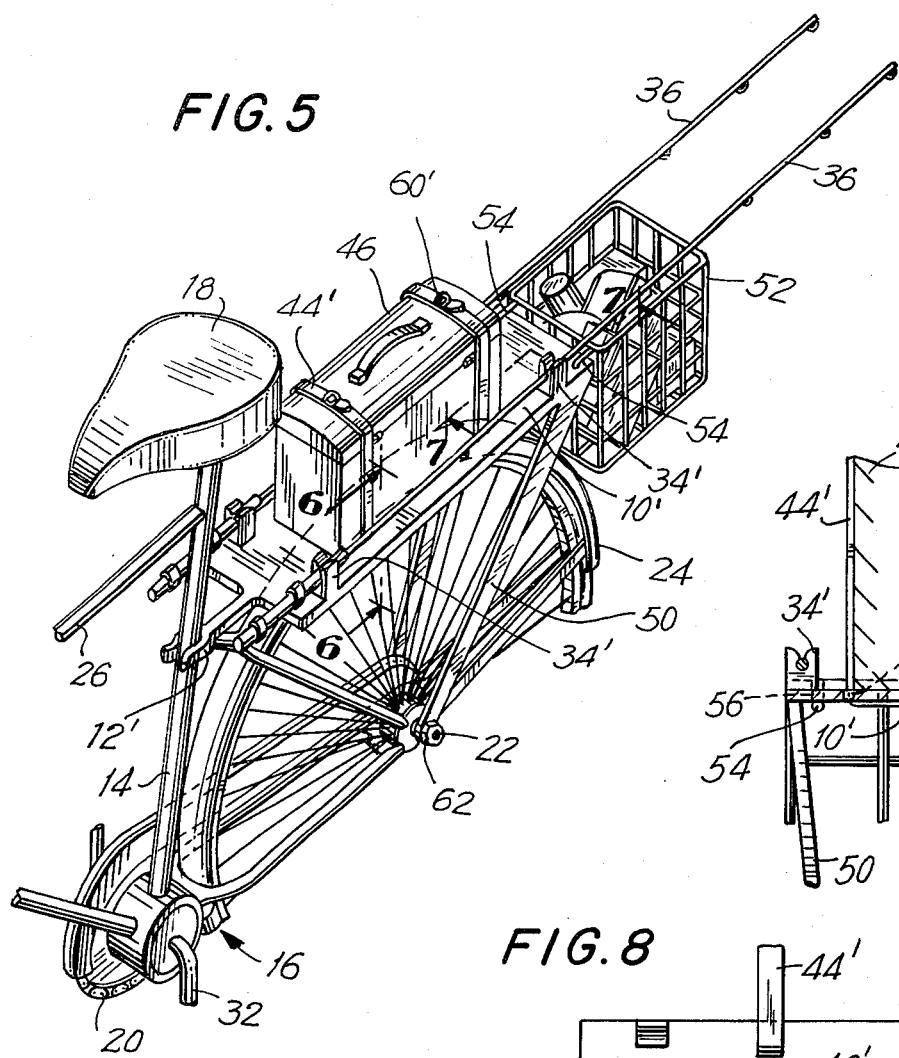
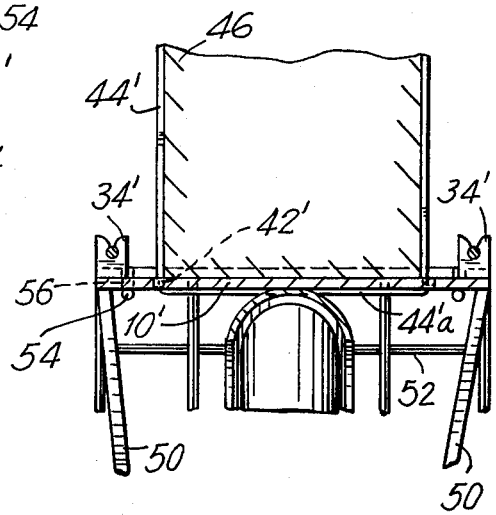
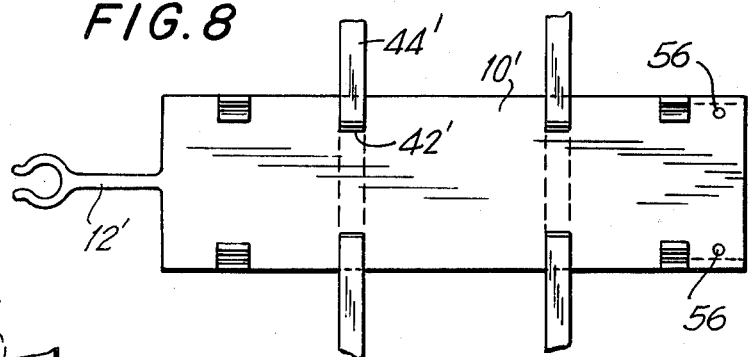
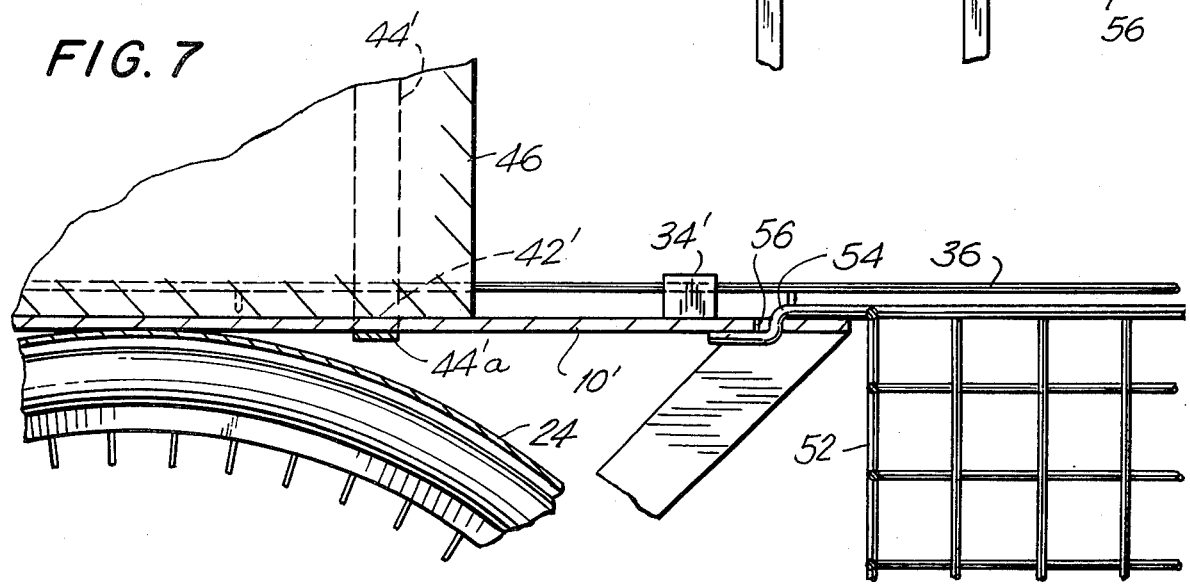

BICYCLE RACK

This invention relates primarily to bicycle fishing equipment carriers.

With the onset of energy shortages and the popular reaction thereto by seeking means of transportation, wherever possible, alternative to a motor vehicle, it has been increasingly important to adapt bicycles for various carrying functions. For instance, a large segment of the population is involved in the sport or necessity of fishing. Heretofore, people who have been involved in fishing would use a motor vehicle primarily because of the capability of such vehicles to carry the equipment necessary for fishing.

Fishing requires at the very least a fishing pole and usually a box (tackle box) used to contain fishing tackle, bait and hopefully the catch.

Fishing tackle would include such items as lures, sinkers, various hooks and miscellaneous other useful fishing equipment.

Presently available bicycle racks usually comprise a mesh of tubular members arranged to form a planar, rectangular rack which attaches with a horizontal orientation to the rear fender of a bicycle. Such available bicycle racks are disadvantageous for carrying fishing equipment since the available bicycle racks are usually too narrow transversely to fixedly support a tackle box and do not lend themselves easily to the attachment of fishing poles. Of course, various riggings can be used with available bicycle racks in order to adapt them to such carrying functions; however, such rigging is cumbersome and inconvenient to the point that the fishing population is unwilling to go through the rigging procedures necessary in order to make bicycles suitable for replacement of motor vehicles with regard to fishing ventures.

Furthermore, attempts have been made to provide a construction for a bicycle or a bicycle rack which enables the support of fishing poles in a generally vertical orientation. Such attempts have suffered the drawbacks of extending the fishing poles to a height which causes interference by trees and other overhangings with the smooth operation of a bicycle. Those attempts that have involved the horizontal orientation of a bicycle usually attached the fishing poles forward of the seat support such that the fishing poles, when attached to the bicycle, interfered with the operator's legs and otherwise interfered with the proper operation of the bicycle.

Accordingly, a primary object of the present invention is to provide a bicycle rack suitable for carrying fishing equipment.

A further and more particular object of the present invention is to provide a bicycle rack conveniently adaptable to standard bicycle construction which enables the quick and convenient support thereby of fishing equipment, fishing poles and tackle boxes.

A still further and more particular object of the present invention is to provide means for attaching fishing poles to a bicycle in a horizontal orientation with the fishing poles extending rearwardly of the bicycle seat support.

These and other objects of the present invention are accomplished in accordance with one illustrative embodiment of the present invention which features a rear fender bicycle rack for attachment to a bicycle having a generally vertically oriented seat support. The bicycle rack of the present invention is primarily intended for supporting fishing equipment, the bicycle rack including a generally horizontally oriented platform having a forwardly extending bracket for attachment thereof to the seat supporting pole. V-slot brackets depend from the platform in pairs in order to support fishing poles generally parallel to the bicycle's path of travel, generally horizontally and rearwardly of the seat supporting pole. Fishing tackle box supports are included either on the platform or, alternatively, a basket depends rearwardly from the platform into which a tackle box and other fishing equipment can be inserted for convenient carrying. Specifically, the box supporting means of the platform may include straps attached through slots therein for encircling a tackle box and thereby securing it for convenient carriage. The platform, in addition to being supported by the forwardly extending bracket previously mentioned, may be otherwise secured by either direct attachment to the rear fender of the bicycle, bracketed attachment to an existing, underlying, rear fender bracket or by extending elongated supports from the platform to the rear axle of the bicycle.

The above brief description, as well as further objects, features and advantages of the present invention, will be more fully appreciated by reference to the following, detailed description of the preferred, but nonetheless illustrative embodiment, when taken in conjunction with the accompanying drawings, wherein:

FIG. 5 is an isometric view of a rack according to an alternative embodiment of the present invention, showing particularly the use and construction of a rearwardly depending carrying basket in connection with the platform of the bicycle rack;

FIG. 6 is a front, sectional, partial view taken along the line 6—6 of FIG. 5;

FIG. 7 is a side, sectional, partial view taken along the line 7—7 of FIG. 5; and FIG. 8 is a top view of a bicycle rack according to an alternative embodiment as shown in FIG. 5.

Figure 1:
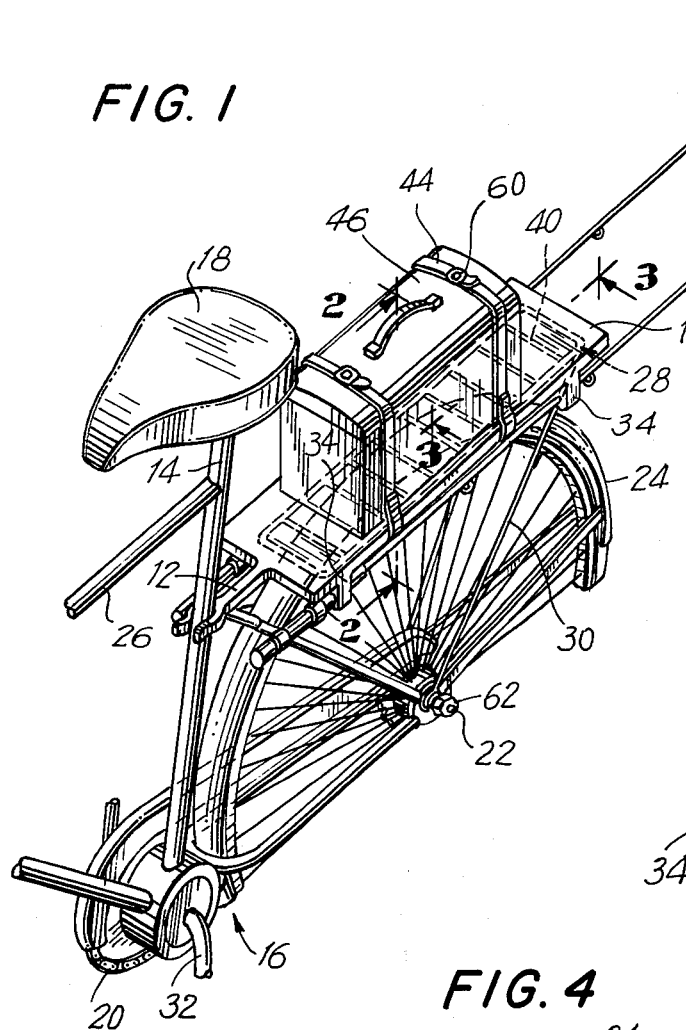
FIG. 1 is an isometric view of a bicycle rack according to a preferred embodiment of the present invention showing particularly the construction for supporting and extending fishing poles rearwardly of a seat supporting pole of a bicycle.
Figure 2:
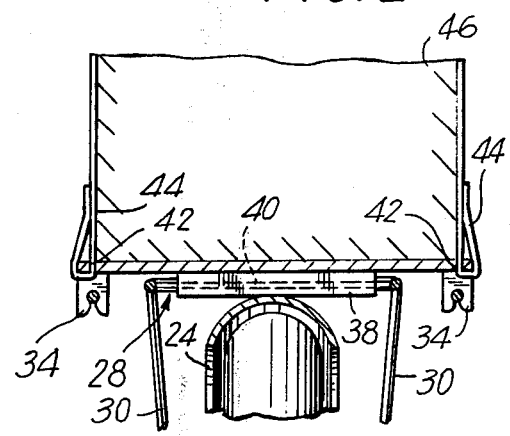
FIG. 2 is a front, sectional, partial view of a bicycle rack according to a preferred embodiment of the present invention, taken along the line 2—2 of FIG. 1.
Figure 4:
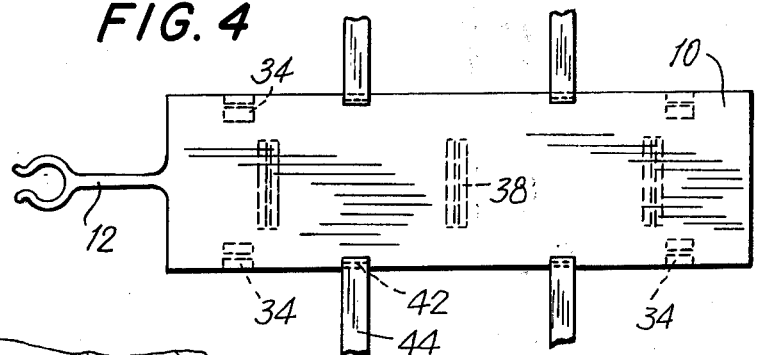
FIG. 4 is a top view of the bicycle rack of FIG. 1 showing particularly the forwardly extending, supporting bracket thereof and the means for attaching a tackle box thereto.
Figure 3:
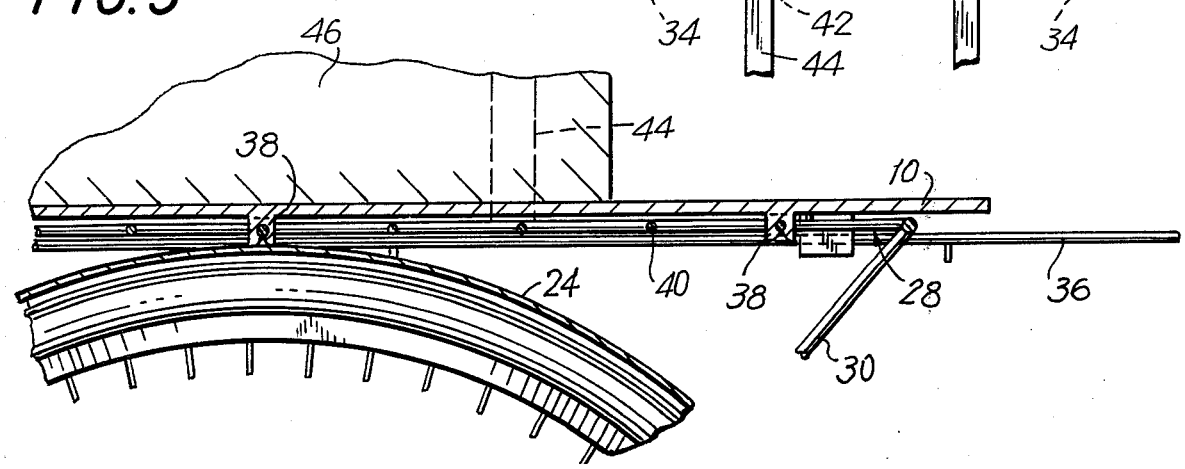
FIG. 3 is a side, sectional, partial view of a bicycle rack according to a preferred embodiment of the present invention, taken along the line 3—3 of FIG. 1 and showing particularly the attachment of the bicycle rack by bracketing it to a prior art bicycle rack.

Referring firstly to FIGS. 1 through 4, a preferred embodiment of the invention is illustrated. A bicycle rack according to the preferred embodiment includes a platform 10 having a forwardly extending bracket 12 for attachment to seat supporting pole 14 of a standard bicycle construction, generally designated 16. The bicycle construction 16, of course, includes such basic elements as seat 18, drive chain 20, rear axle 22, rear fender 24, cross bar 26 and prior art bicycle rack 28 affixed to rear axle 22 by means of depending support members 30.

It may be seen from such a bicycle construction 16, that the attachment of fishing poles to the rear cross member 26, as has been suggested by prior art constructions would interfere significantly with the operation of the bicycle by a person sitting upon seat 18 and extending his legs downwardly toward pedalling mechanism 32.

Accordingly, brackets 34 depend from platform 10 in pairs such that fishing poles 36 are attached to the underside of platform 10 to extend rearwardly, generally horizontally, generally aligned with the travelling path of the bicycle and without extending further forward of the bicycle than seat supporting pole 14.

In addition to supporting platform 10 by means of forwardly extending bracket 12, platform 10 is secured to the bicycle by means of transverse, V-slot clamps 38, which are suitable for securely encircling transverse members 40 of prior art bicycle rack 28.

Furthermore, platform 10 is constructed to define slots 42 through which straps 44 may be inserted for encircling tackle box 46 or the like.

Alternatively, or additionally, another fishing pole supporting means is used for the present invention as shown in FIGS. 5-8. platform 10' includes upstanding, V-slot pole brackets 34' for insertion of fishing poles 36 within the same limitations as are provided for by the preferred embodiment of FIGS. 1-4; that is, generally horizontally, generally parallel to the path of travel of bicycle construction 16 and rearwardly only of seat supporting pole 14. Thus, a person sitting upon seat 18 will not have his operation of the bicycle interfered with as in the prior art arrangements for carrying fishing poles 36.

In the embodiment of FIGS. 5-8, a prior art bicycle rack 28, as was used with the preferred embodiment, is unnecessary. Alternatively, platform 10' includes elongated supports 50 depending for attachment to axle 22 of bicycle construction 16. Furthermore, forwardly extending bracket 12', as with the preferred embodiment, is used to attach platform 10' to bicycle construction 16.

Tackle box 46 is secured on top of platform 10' by means of straps 44', but with slightly different attachment than that used in the preferred embodiment. Specifically, platform 10' defines slots 42' through which straps 44' are inserted continuously beneath platform 10' as shown at 44'a in FIG. 6.

For further fishing equipment, or alternatively to carry tackle box 46, the alternative embodiment illustrates the use of basket 52, forwardly of which extend braces 54 for insertion through brace openings 56 defined in the rear portion of platform 10'.

Thus, it may be seen that the top platform space used by brackets 34' in the alternative embodiment requires a transversely narrower tackle box 46 or provides bracket 52 to carry the tackle box in a convenient and efficient manner.

In order to provide a more complete description of the invention, a series of assembly and use steps will now be described with reference to both the preferred and alternative embodiments.

The assembly of a rack for a bicycle or motorcycle (generally, any cycle vehicle or the like) according to the present invention involves pushing forwardly extending bracket 12 into engagement with seat supporting pole 14 of bicycle construction 16. Simultaneously, previously or thereafter, V-slot clamps 38 are pushed down onto transverse members 40 of prior art bicycle rack 28. As to the preferred embodiment, the bicycle rack according to the present invention is now ready for use. Tackle box 46 is placed on platform 10 and straps 44 are secured around tackle box 46 by simple connecting buckles 60. Poles 36 are then moved upwardly into the V-slots defined by depending pole brackets 34 and the fisherman is ready for travelling to the fishing location without unnecessary energy waste and with little waste of time.

In the alternative embodiment, bracket 12' is pushed onto seat supporting pole 14, as in the preferred embodiment, but platform 10' is therewith supported by means of the attachment of depending elongated supports 50 to axle 22. Such attachment to axle 22 is performed simply by removing nut 62, placing depending elongated support 50 on the axle bolt and thereafter replacing nut 62. The tackle box, for the alternative embodiment, is thereafter placed on platform 10' or in basket 52 and buckles 60' joined if the first alternative is used.

All in all, a convenient, yet easy to assemble bicycle rack is provided by the present invention in order to save energy, save time, and otherwise suit the convenience of the fisherman.

What is claimed is:

1. A rear-fender cycle rack for attachment to a cycle vehicle having a seat supporting pole and for supporting fishing equipment comprising a platform for generally horizontal orientation, a bracket for attachment of said platform to said seat supporting pole for stabilizing said platform, V-slot bracket means attached to said platform for attachment to and support of a pole-like object to extend generally horizontally and rearwardly with respect to said seat supporting pole and for preventing said object from extending forwardly of said seat supporting pole.

2. The invention according to claim 1 wherein said bracket means includes V-slot pole brackets depending from said platform.

3. The invention according to claim 1 wherein said bracket means includes V-slot pole brackets upstanding from said platform.

4. The invention according to claim 1 wherein a basket depends rearwardly of and attached to said platform for fixedly supporting a fishing tackle box.

5. The invention according to claim 1 wherein a pair of V-slot clamps depend from said platform for attaching said platform to said cycle vehicle.

* * * * *